(12) United States Patent
Rodriguez et al.

(10) Patent No.: US 12,426,131 B2
(45) Date of Patent: Sep. 23, 2025

(54) PORTABLE FOOD WARMER

(71) Applicants: Nancy Marie Rodriguez, Palmdale, CA (US); Edmundo Pando Rodriguez, Palmdale, CA (US)

(72) Inventors: Nancy Marie Rodriguez, Palmdale, CA (US); Edmundo Pando Rodriguez, Palmdale, CA (US)

( * ) Notice: Subject to any disclaimer, the term of this patent is extended or adjusted under 35 U.S.C. 154(b) by 658 days.

(21) Appl. No.: 17/670,922

(22) Filed: Feb. 14, 2022

(65) Prior Publication Data

US 2023/0262847 A1    Aug. 17, 2023

(51) Int. Cl.
*H05B 3/80* (2006.01)
*G01K 1/02* (2021.01)

(52) U.S. Cl.
CPC ............................... *H05B 3/80* (2013.01); *G01K 1/02* (2013.01)

(58) Field of Classification Search
CPC ...... G01K 13/00; G01K 1/02; G01K 2207/06; H05B 3/78; H05B 3/80; H05B 3/82; A47J 36/24; A47J 36/2411; A47J 36/2433; A47J 36/2444; A47J 36/2461; A47J 36/2472; A47J 36/2483; A47J 36/18–19; A47J 36/11–12; A47J 36/14–20
See application file for complete search history.

(56) References Cited

U.S. PATENT DOCUMENTS

| | | | |
|---|---|---|---|
| 3,064,113 A * | 11/1962 | Pitrone | A47J 36/2433 215/11.1 |
| 5,968,396 A | 10/1999 | Rodriguez | |
| 2017/0245678 A1* | 8/2017 | Wakeham | A61J 11/008 |
| 2022/0023514 A1* | 1/2022 | Zhang | A61M 1/068 |
| 2023/0157383 A1* | 5/2023 | Self | H05B 3/342 219/211 |

FOREIGN PATENT DOCUMENTS

| | | | |
|---|---|---|---|
| CN | 86204755 U | * | 8/1987 |
| JP | 2000152881 A | * | 6/2000 |
| KR | 2010-0088526 A | * | 8/2010 |

* cited by examiner

*Primary Examiner* — Hung D Nguyen
(74) *Attorney, Agent, or Firm* — Phillips Lytle LLP; David L. Principe

(57) ABSTRACT

Disclosed embodiments provide a food warming apparatus. The food warming apparatus is well suited for warming liquids, and/or softer foods such as purees, puddings, cereals, and the like. For babies, having food and beverages at the proper temperature range can increase the likelihood that the baby will consume the desired amount of the food/beverage. Beverages for babies are typically served in bottles with a nipple attachment, and/or containers with a straw attachment, commonly referred to as "sippy cups." Disclosed embodiments provide a battery-powered microprocessor-controlled heating wand that can heat beverages such as formula and/or breastmilk, as well as soft foods such as purees and puddings, to an elevated temperature that is more palatable for a baby. The apparatus is battery-powered and portable, allowing parents/caregivers to easily and safely heat the food/beverages to a preferred temperature while on the go, and/or away from home.

11 Claims, 16 Drawing Sheets

PORTABLE FOOD WARMER

FIELD

The present invention relates generally to an apparatus for warming food, and more particularly, to a portable food warmer.

BACKGROUND

In general, many babies prefer food or drinks which are served at warm temperatures. As a result, parents, guardians, caregivers and/or others try to ensure that babies' food or drinks are at the babies' preferred temperature range. Although techniques exist for warming bottles and other similar containers, such methods and apparatuses can often be inconvenient, ineffective, and cumbersome, especially when travelling outside of the home.

SUMMARY

In one embodiment, there is provided an apparatus, comprising a heating wand; a power unit; and a container cover.

In another embodiment, there is provided an apparatus, comprising a heating wand; a container cover; and a power unit, wherein the power unit comprises: a processor; a memory coupled to the processor; a power source; a power controller coupled to the processor and the power source; and wherein the memory contains instructions, that when executed by the processor, supply power from the power source to the heating wand based on a pulse width modulated signal that is controlled by the processor.

In yet another embodiment, there is provided a kit, comprising: a heating wand; a power unit; a container cover; a cylindrical case, wherein the cylindrical case comprises a first portion, and a second portion, wherein the first portion is attached to the second portion with a hinge; wherein the heating wand, the power unit, and the container cover fit into the cylindrical case.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
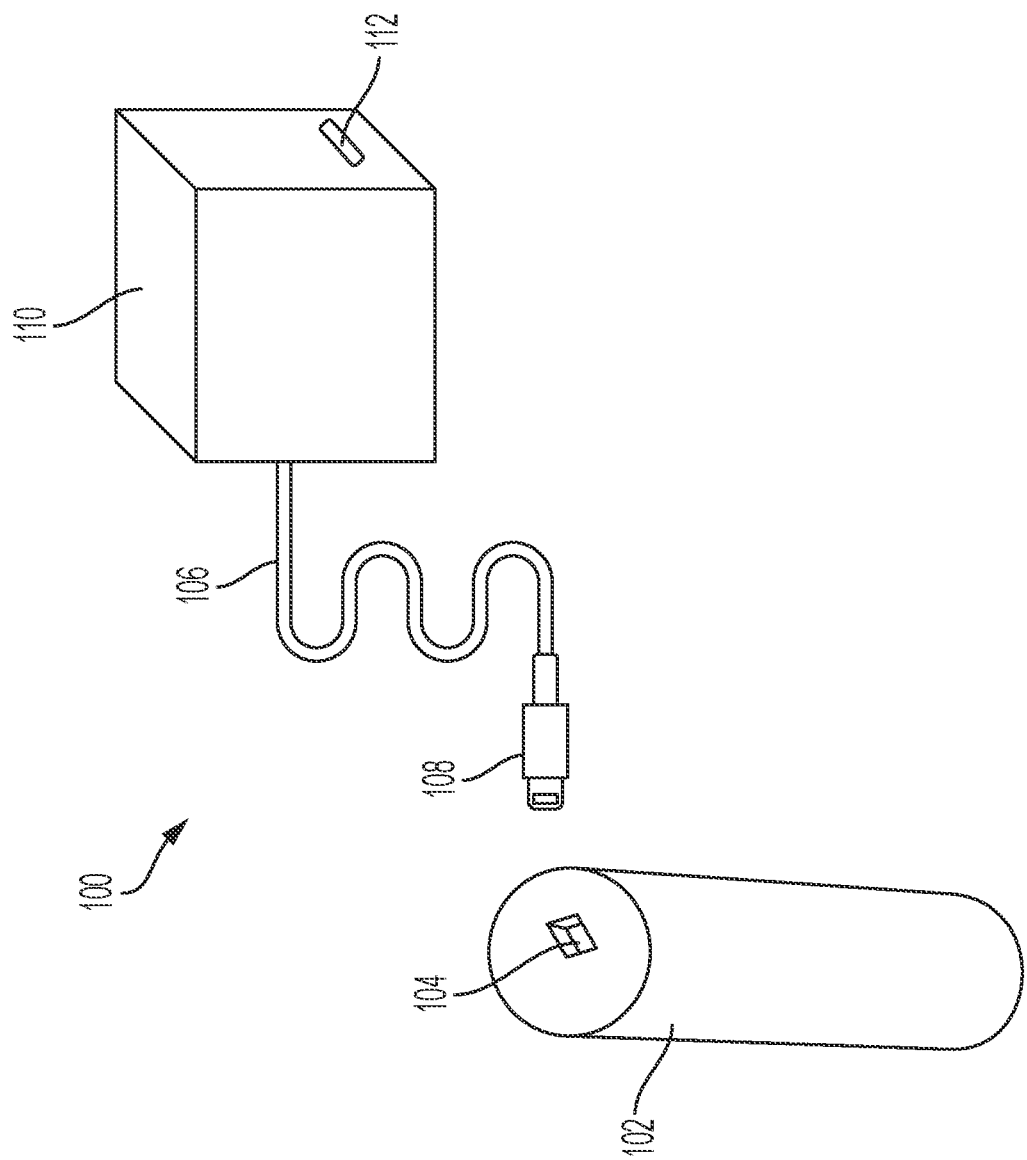
FIG. 1 shows a heating wand in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide a food warming apparatus. The food warming apparatus is well suited for warming liquids, and/or softer foods such as purees, puddings, cereals, and the like. For babies, having food and beverages at the proper temperature range can increase the likelihood that the baby will consume the desired amount of the food/beverage. Beverages for babies are typically served in bottles with a nipple attachment, and/or containers with a straw attachment, commonly referred to as "sippy cups." Disclosed embodiments provide a battery-powered microprocessor-controlled heating wand that can heat beverages such as formula and/or breastmilk, as well as soft foods such as purees and puddings, to an elevated temperature that is more palatable for a baby. The apparatus is battery-powered and portable, allowing parents/caregivers to easily and safely heat the food/beverages to a preferred temperature while on the go, away from home.

The contents of U.S. Pat. No. 5,968,396, issued Oct. 19, 1999, and titled "WARMER INSERTABLE INTO BOTTLE" is incorporated herein by reference in its entirety.

Reference throughout this specification to "one embodiment," "an embodiment," "some embodiments", "embodiments," or similar language means that a particular feature, structure, or characteristic described in connection with the embodiment is included in at least one embodiment of the present invention. Thus, appearances of the phrases "in one embodiment," "in an embodiment," "in some embodiments", "in embodiments," and similar language throughout this specification may, but do not necessarily, all refer to the same embodiment.

Moreover, the described features, structures, or characteristics of the invention may be combined ("mixed and matched") in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

For the purposes of disclosure, the word, "substantially" is defined as "for the most part". It means "to a great extent," but having some room for some minor variation.

FIG. 1 shows an apparatus 100 including a heating wand 102 in accordance with embodiments of the present invention. Heating wand 102 is elongate, and has a power connection port 104 at a top end. The power connection may be a USB-C connection, or other suitable power connection. A power unit 110 contains a battery, and additional electronic components for powering the heating wand 102 via cable 106, which terminates in connector 108. The connector 108, when inserted into the power connection port 104, serves to provide power to the heating wand 102. In embodiments, the connection port 104 can include a USB-C connector, or other suitable connector type. The power unit 110 further includes a charging port 112, allowing the battery within the power unit 110 to be replenished from another source, such as household alternating current (AC) power, direct current (DC) power from an automobile, or other suitable power source. In embodiments, charging port 112 may be a USB-A charging port, or other suitable charging port type now known or hereafter developed.

Figure 2A:
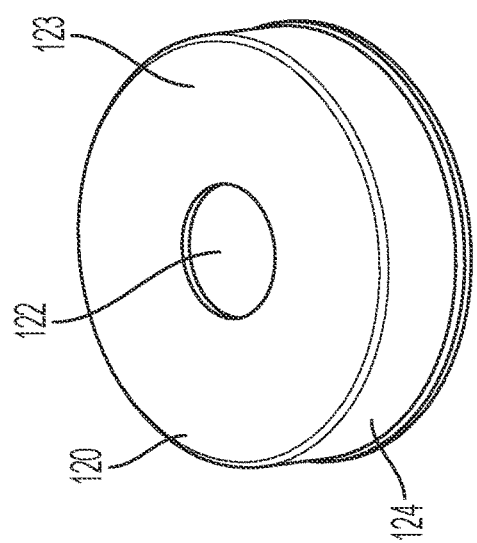
FIG. 2A shows a top perspective view of a container cover in accordance with embodiments of the present invention.
Figure 2B:
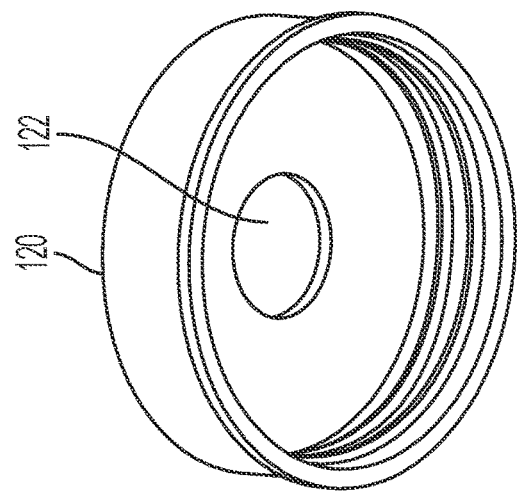
FIG. 2B shows a bottom perspective view of a container cover in accordance with embodiments of the present invention.

FIG. 2A shows a top perspective view of a container cover 120 in accordance with embodiments of the present invention. FIG. 2B shows a bottom perspective view of the container cover 120 of FIG. 2A. In embodiments, the container cover comprises a top opening 122 formed in the top surface 123 of the container cover 120. The top opening 122 is sized for the heating wand 102 to pass therethrough.

In some embodiments, the top opening is concentric with the container cover 120. The container cover 120 further comprises a side portion 124 connected to the top surface 123. The side portion fits around a container such as a baby bottle. In some embodiments, the container cover is comprised of plastic. In some embodiments, the container cover is comprised of silicone. The silicone allows the container cover 120 to stretch to fit a variety of different sized containers. The container cover may be made from any suitable material that can create a seal or substantial seal between the side surface 104 and the container when installed on the container.

Figure 3A:
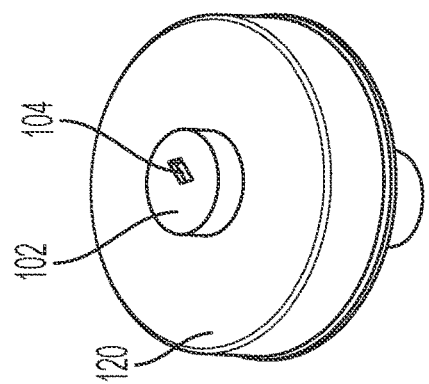
FIG. 3A shows a top perspective view of a container cover installed on a heating wand in accordance with embodiments of the present invention.
Figure 3B:
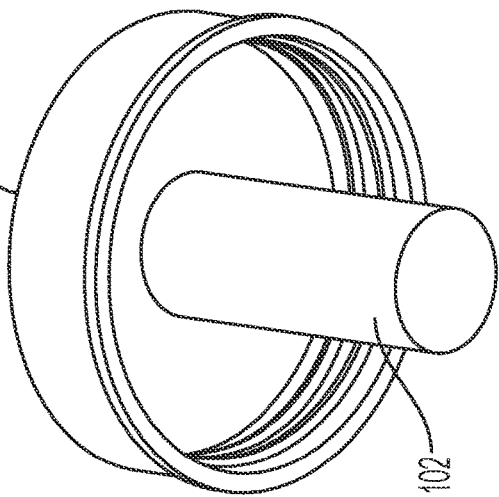
FIG. 3B shows a bottom perspective view of a container cover installed on a heating wand in accordance with embodiments of the present invention.
Figure 3C:
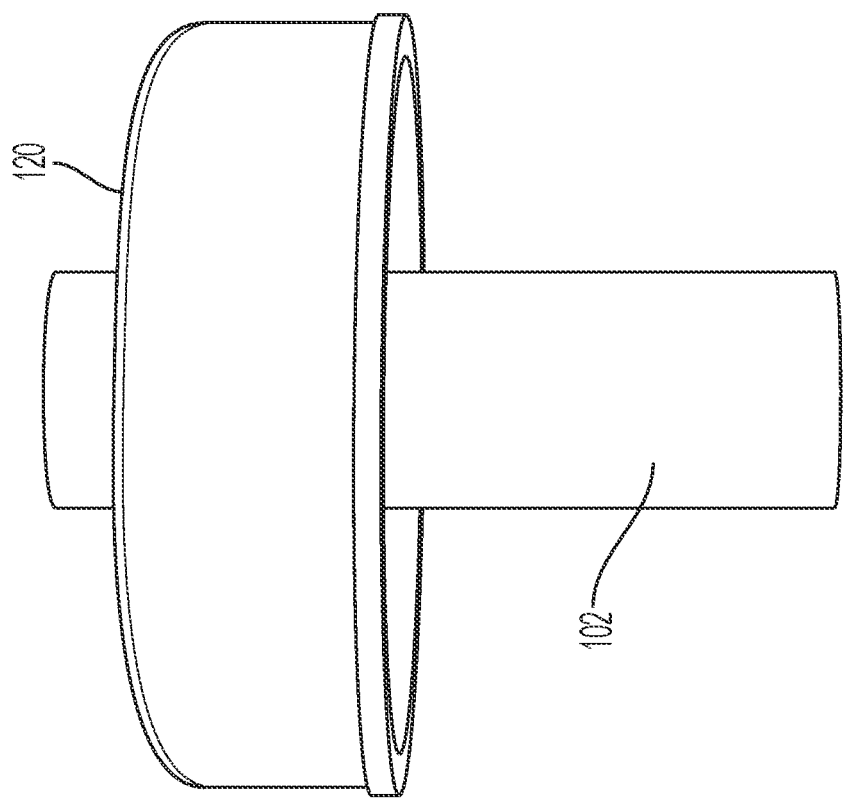
FIG. 3C shows a side view of a container cover installed on a heating wand in accordance with embodiments of the present invention.

FIG. 3A shows a top perspective view of a container cover 120 installed on heating wand 102 in accordance with embodiments of the present invention. FIG. 3B shows a bottom perspective view of the container cover 120 installed on the heating wand 102. FIG. 3C shows a side view of the container cover 120 installed on the heating wand 102. The container cover 120 is installed on the heating wand 102 by inserting the heating wand 102 through the top opening 122. The top opening 122 may be sized such that the heating wand 102 stays in position via a friction fit. Friction fit is one example of how the heating wand may stay in position. Other suitable mechanisms are included within the scope of the invention. Thus, embodiments can include a heating wand 102; a power unit 110, the power unit electrically connected to the heating wand; and a container cover 120 installed on the heating wand 102.

Figure 4:
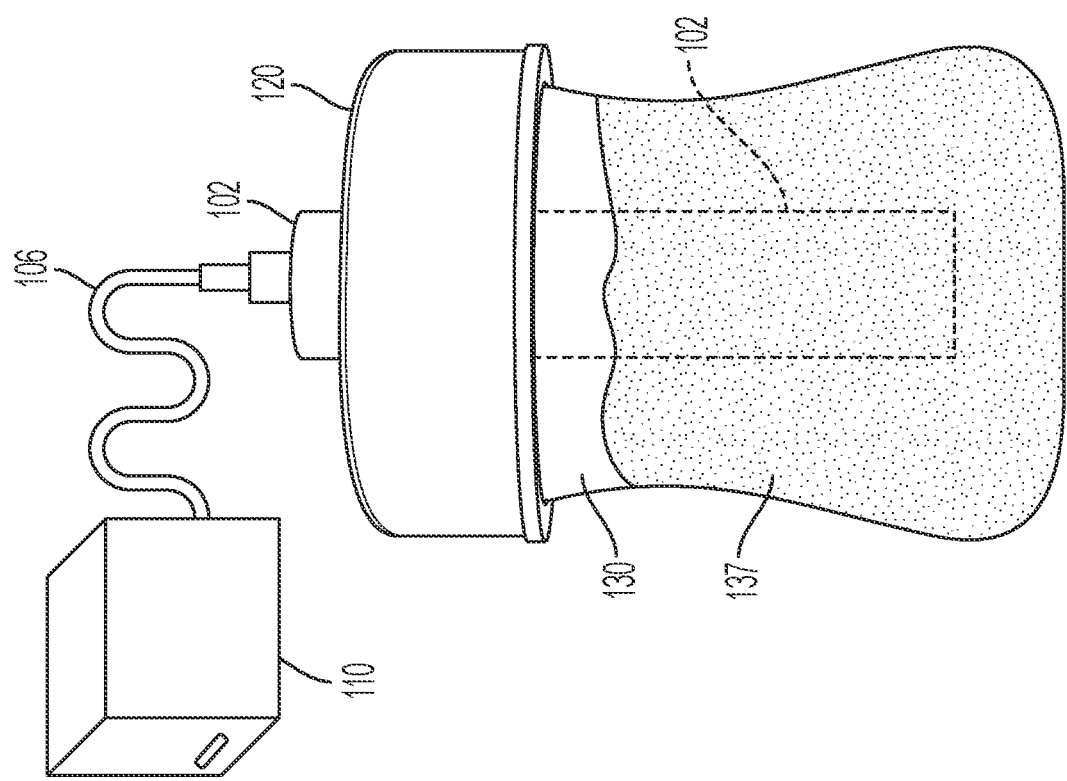
FIG. 4 shows a side view of a container cover installed on a heating wand as used with a container in accordance with embodiments of the present invention.

FIG. 4 shows a side view of container cover 120 installed on a heating wand 102 as used with a container 130 in accordance with embodiments of the present invention. As shown, the container is transparent, but other colors are included within the scope of the invention. To warm the contents of container 130, the container 130 is opened, and the container cover 120 is inserted onto the top of the container 130. In some embodiments, the container cover 120 is comprised of silicone, such that it can snuggly fit over a variety of different sized container openings. The cable 106 from the power unit 110 is inserted into the power connection port 104 (FIG. 1) to provide power to the heating wand 102, such that the heating wand 102 transfers heat to the contents 137 (e.g., a beverage for a baby) of the container 130.

Figure 5B:
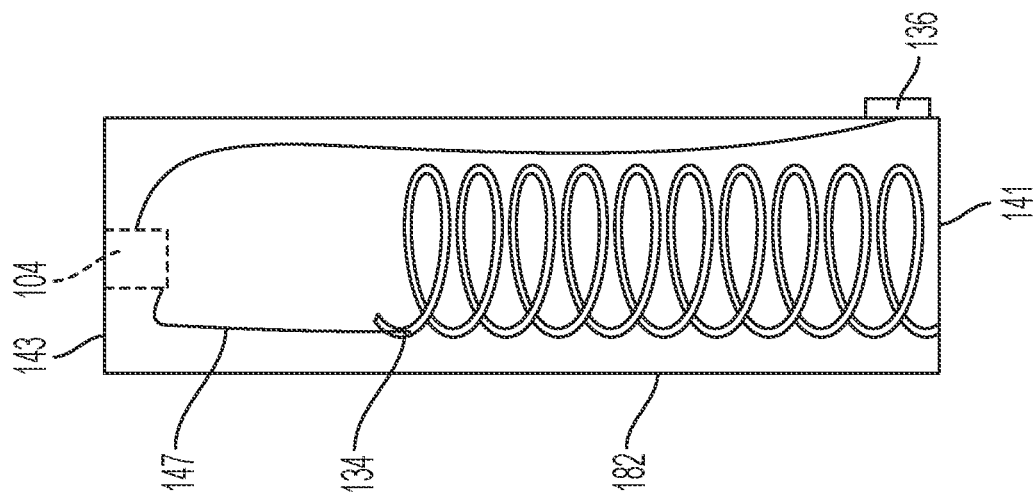
FIG. 5B shows an internal view of a heating wand in accordance with alternate embodiments of the present invention.
Figure 5A:
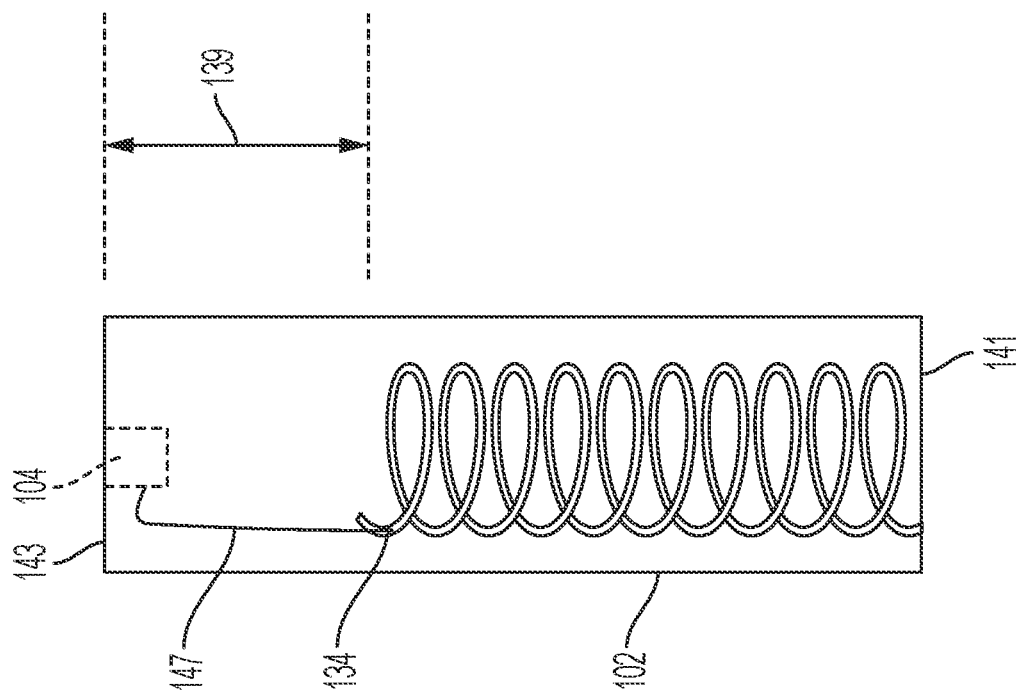
FIG. 5A shows an internal view of a heating wand in accordance with embodiments of the present invention.

FIG. 5A shows an internal view of heating wand 102. In embodiments, the heating wand comprises a heating element 134 extending from a first end 141 of the heating wand, to an intermediate point, wherein the intermediate point is at a distance 139 from a second end 143 of the heating wand 102. In some embodiments, the distance 139 ranges from four centimeters to ten centimeters. In this way, the upper section of the heating wand is not heated, and the efficiency of the heating wand is improved, as most or all of the heating element is directed towards the section of the wand, where the heat is applied to the food/beverage contents within a container. The heating element 134 is electrically connected to the power connection port 104 via electrical conduit 147 to receive power from the power unit 110 (FIG. 1). Heating element 134 may be of any well known, suitable type of electrical resistance heater.

FIG. 5B shows an internal view of a heating wand 182 in accordance with alternate embodiments of the present invention. This embodiment is similar to the embodiment of FIG. 5A, with the addition of a temperature sensor 136 located proximal to the first end of the heating wand. Thus, in some embodiments, the heating wand 182 further comprises a temperature sensor 136 located proximal to the first end 141 of the heating wand 182. Although the sensor is shown and described proximal to the first end, in practice it may be disposed anywhere suitable. In embodiments, the temperature sensor 136 can include a thermocouple, thermistor, Wheatstone bridge circuit, or other suitable temperature sensor.

In embodiments, the temperature sensor 136 can provide temperature values to the power unit 110. The temperature values can be used as part of a safety mechanism, to shut down power to the heating wand 182 in the event of an overtemperature condition. Additionally, the temperature values can be used to determine when a food is at a desired temperature or temperature range. In some embodiments, the power unit may automatically deactivate the heating wand when a target temperature is reached. In some embodiments, the power unit may generate an alert when the target temperature is reached, alerting the parent/caregiver that the food/beverage is at the desired temperature for serving.

Figure 6:
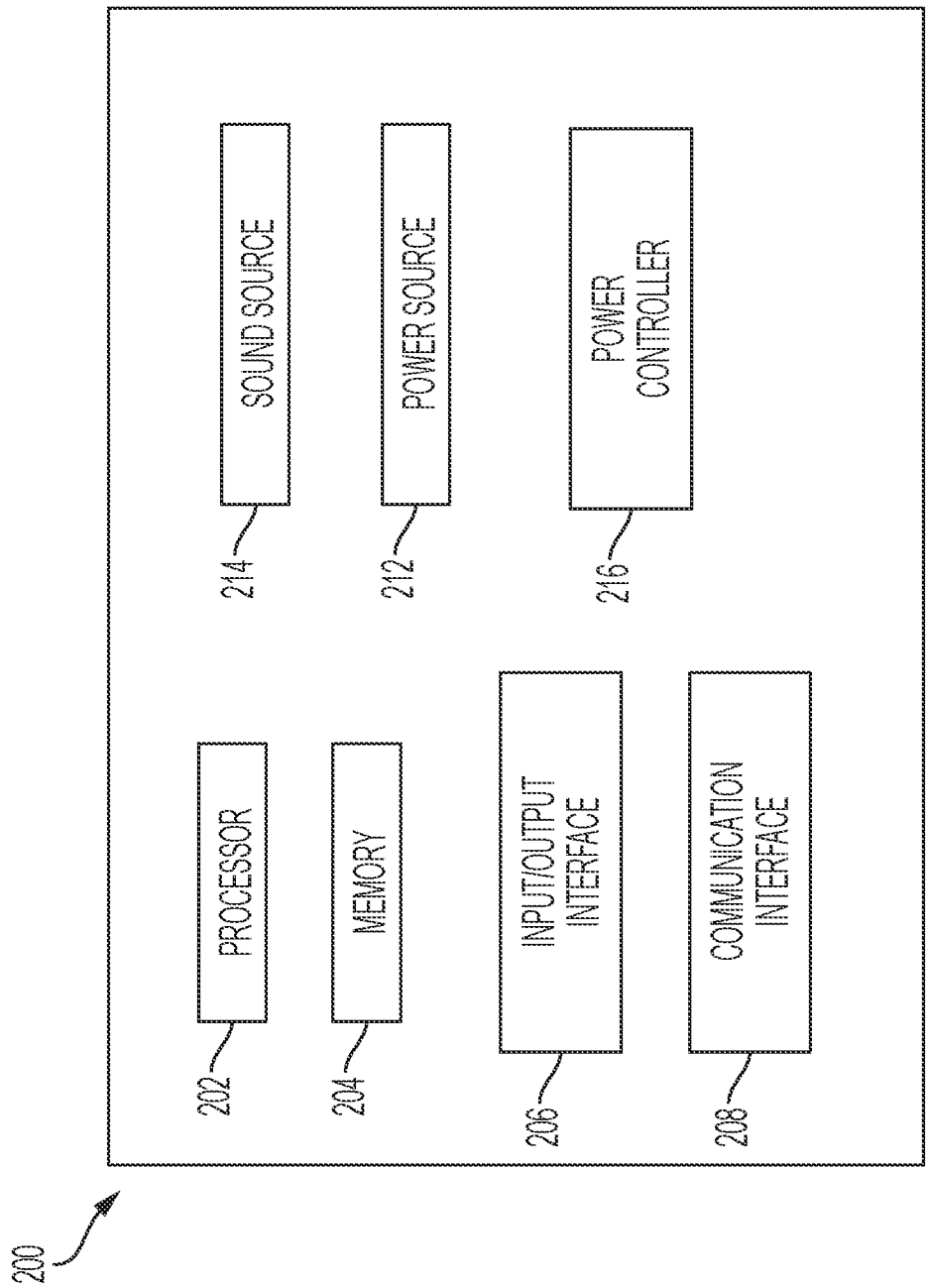
FIG. 6 is a block diagram for a power unit in accordance with embodiments of the present invention.

FIG. 6 is a block diagram for a power unit 200 in accordance with embodiments of the present invention. Power unit 200 may be similar to power unit 110 shown in FIG. 1. At 202, there is a processor, which may be a microprocessor, microcontroller, or other suitable processor type. At 204 there is computer memory 204. Computer memory 204 is coupled to the processor 202. The computer memory can include random-access memory (RAM), read-only memory (ROM), flash memory, non-volatile memory (SRAM), and/or other suitable memory types. At 206, there is an input/output interface. The input/output interface 206 can include one more input, output, and/or bidirectional pins to generate/and or receive signals in order to implement functions of disclosed embodiments.

At 208, there is an optional communication interface. In some embodiments, a communication interface may be used to communicate with a remote computing device, such as a smartphone, smartwatch, tablet computer, laptop computer, wearable computer, vehicle infotainment system, and/or other computing device. In embodiments, the communication interface 208 can include Wi-Fi interface, Bluetooth® interface, Zigbee interface, infrared interface, and/or other suitable communication interface now known or hereinafter developed.

At 212, there is a power source. In embodiments, the power source is a battery. In embodiments, the battery is a lithium-ion battery, nickel metal hydride battery, alkaline disposable battery cell, lithium-sulfur battery, aluminum-graphite battery, and/or other suitable battery type, now known, or hereinafter developed.

At 214, there is an optional sound source. Sound source 214 can include a speaker, buzzer, chime, and/or other suitable sound-producing device. The sound source 214 is used in some embodiments to provide an audible alert. The alert can indicate various events, including, but not limited to, activation of the heating wand, deactivation of the heating wand, reaching a target temperature, and/or an overtemperature condition.

At 216, there is a power controller. Power controller 216 may be a PWM (Pulse Width Modulation) power controller. In embodiments, the power controller administers power to the heating wand in a controlled manner, based on a PWM signal generated by the processor 202. This enables precise control of power distribution from the power source 212, enabling a more efficient use of power.

Embodiments can include an apparatus comprising a heating wand; a container cover installed on the heating wand; and a power unit, the power unit electrically connected to the heating wand, wherein the power unit comprises: a processor; a memory coupled to the processor; a power source; a power controller coupled to the processor and the power source; and wherein the memory contains instructions, that when executed by the processor, supply power from the power source to the heating wand based on a pulse width modulated signal that is controlled by the processor.

Embodiments can further include a communication interface, where the memory further contains instructions, that when executed by the processor, causes the processor to form a communication connection with a remote computing device. In embodiments, the communication interface can include a Bluetooth®, Wi-Fi, or other suitable interface to communicate with a remote computing device such as a smartphone, tablet computer, smartwatch, or other suitable remote computing device. In some embodiments, the power unit may have more or fewer components than those shown in FIG. 6.

Figure 7A:
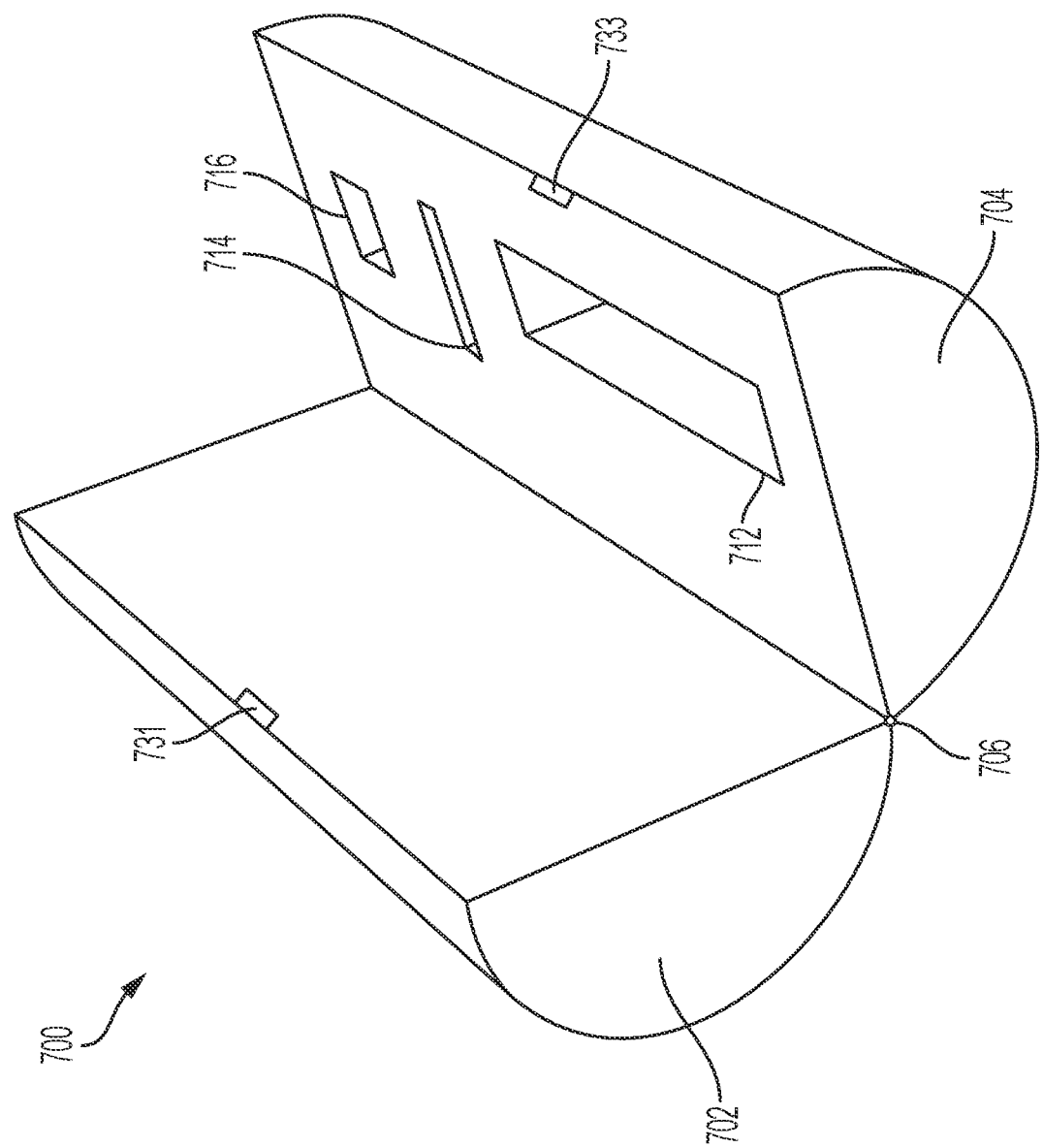
FIG. 7A shows a transport case in accordance with embodiments of the present invention in an open configuration.
Figure 7B:
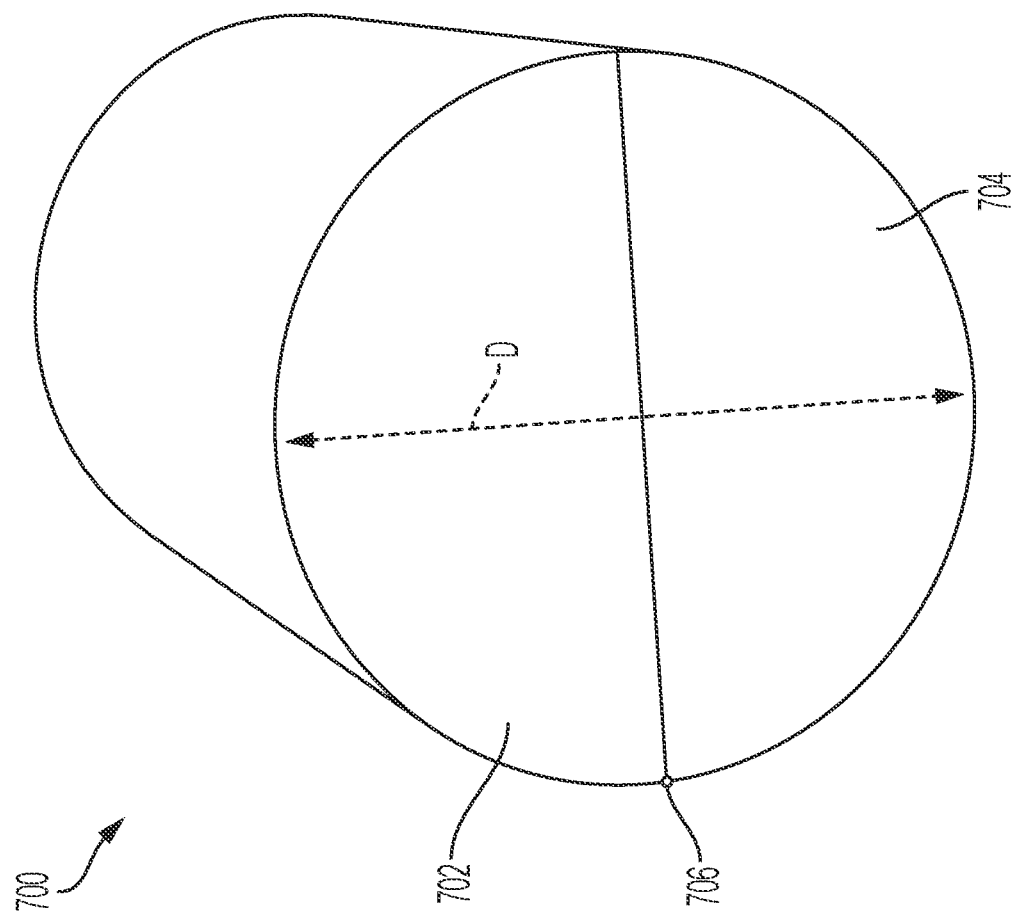
FIG. 7B shows a transport case in accordance with embodiments of the present invention in a closed configuration.

FIG. 7A shows a transport case 700 in accordance with embodiments of the present invention in an open configuration. FIG. 7B shows transport case 700 in a closed configuration. The transport case 700 is cylindrical when closed, having first portion 702, and second portion 704. The first portion 702 and second portion 704 are joined together by a hinge, or other suitable connection mechanism, 706. The second portion has a plurality of cutouts, indicated at 712, 714, and 716. These cutouts are sized to accommodate a heating wand, power unit, one or more container covers, and/or additional accessories. A latch, or other suitable mechanism, may be used to secure the transport case in a closed configuration. In some embodiments, a first latch component 731 is positioned to align with, and latch with, a second latch component 733. In some embodiments, the latch components can be complementary magnets. In some embodiments, the latch components can comprise a hook-and-loop fastener. Other latch types are possible in disclosed embodiments. In some embodiments, instead of cutouts, there are other types of attachments to hold the heating wand, power unit, etc. All suitable mechanisms for attaching are included within the scope of the invention.

In some embodiments, the cylindrical case has a diameter D ranging from seven centimeters to ten centimeters when in the closed configuration. This allows the cylindrical case to be conveniently stowed in a cupholder that is available in most automobiles. In embodiments, the container is comprised of plastic or other suitable material.

Embodiments can include a kit, comprising: a heating wand; a power unit; a container cover; a cylindrical case, wherein the cylindrical case comprises a first portion, and a second portion, wherein the first portion is attached to the second portion with a hinge. In some embodiments, the kit further includes a second container cover. In some embodiments, multiple container covers may be included. In some embodiments, each of the multiple container covers may be of different sizes, to accommodate different size containers.

Figure 8:
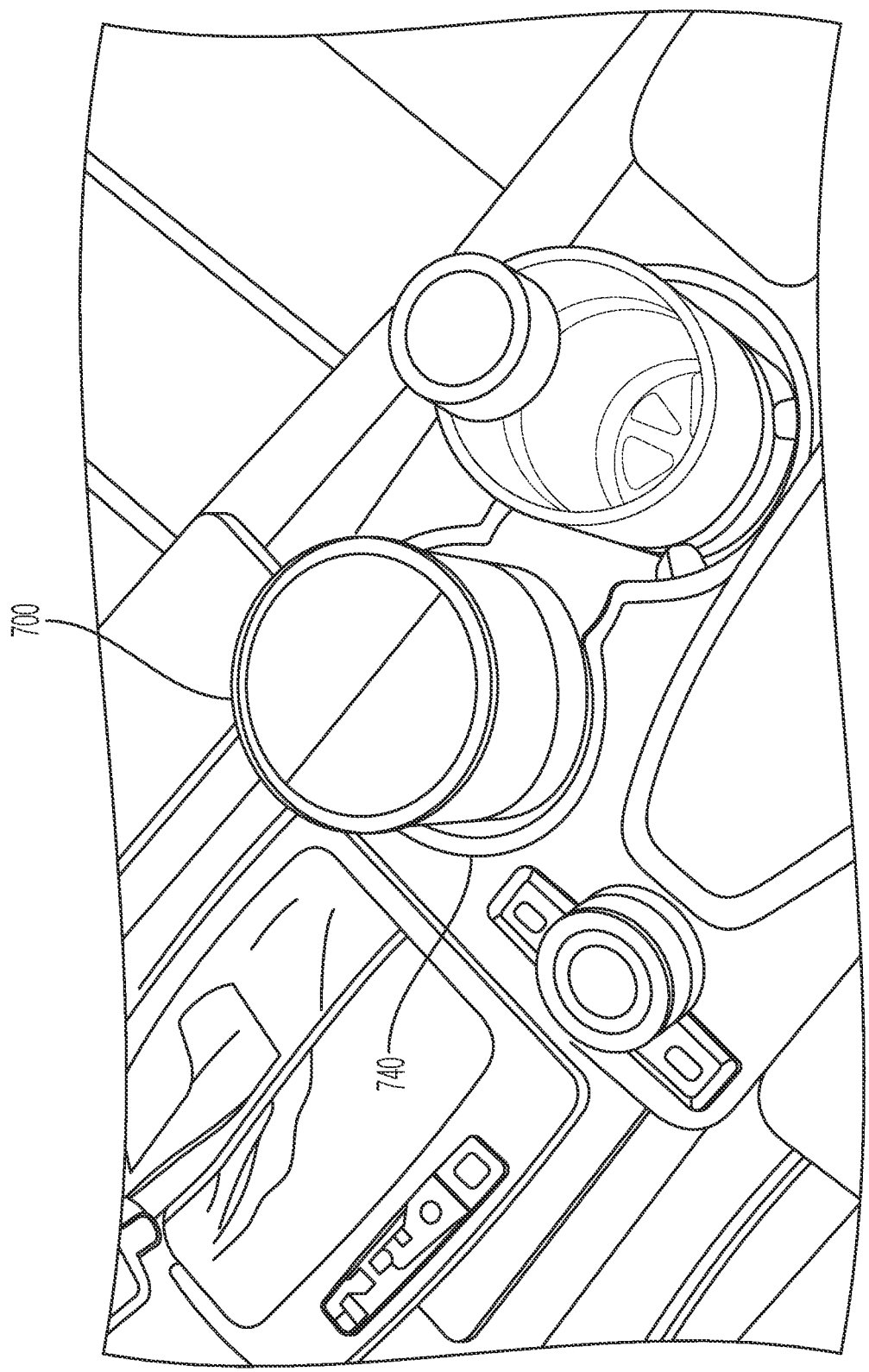
FIG. 8 shows a transport case of disclosed embodiments in an automobile cupholder.

FIG. 8 shows a transport case 700 of disclosed embodiments disposed in an automobile cupholder 740. In this way, the apparatus of disclosed embodiments can be safely and conveniently transported in an automobile, enabling convenient heating of baby bottle contents such as formula, breastmilk, and the like.

Figure 9:
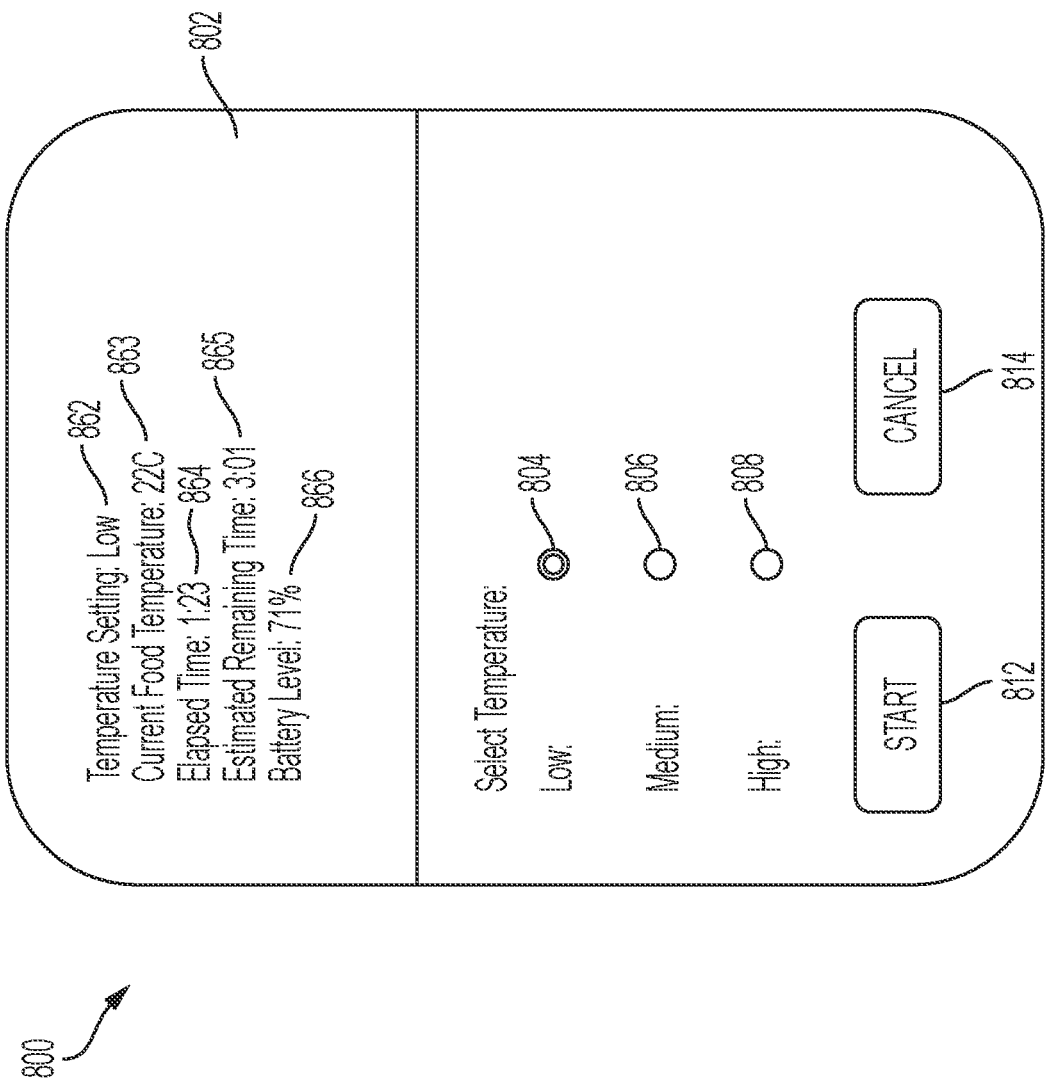
FIG. 9 shows an exemplary user interface in accordance with embodiments of the present invention.

FIG. 9 shows an exemplary user interface 800 in accordance with embodiments of the present invention. The user interface 800 can be implemented on a remote computer such as a smartphone, tablet computer, or other suitable computing device. The remote computer can execute an application (app) to send and/or receive information from the power unit 110 via the communication interface 208.

Received information may be displayed in an information region 802. The information region 802 is an area of the display for showing values of various data fields. At 862, there is a field for a current temperature setting. At 863, there is a field for current food temperature. The current food temperature may be obtained from a temperature sensor 136 located proximal to the first end of the heating wand, such as illustrated in FIG. 5B. Some embodiments may further include an elapsed time field 864, indicating an amount of time the heating wand has been activated during its current use. Some embodiments may further include an estimated remaining time field 865, indicating an estimated amount of time for the contents to reach a target temperature. In embodiments, this may be estimated based on change in temperature as read from temperature sensor 136. Some embodiments may further include a battery level field 866, indicating an estimated amount of battery remaining in the power unit. This data may be obtained from the power unit and transmitted to a remote computing device for display as shown in FIG. 9.

At 804, there is an option for a low temperature setting. At 806, there is an option for a medium temperature setting. At 808, there is an option for a high temperature setting. As shown in FIG. 9, radio buttons are used for making a temperature setting selection. Other embodiments may utilize a different user interface, such as a slider control, dropdown list, or other user interface element. At 812, there is a start button. At 814, there is a cancel button. When the start button 812 is selected, it causes the remote computing device to send a command to the power unit to activate the heating wand. When the cancel button 814 is selected, it causes the remote computing device to send a command to the power unit to deactivate the heating wand. In embodiments, the processor is programmed to receive a temperature setting from the remote computing device, and alter a pulse width modulated signal based on the temperature setting. The pulse width modulated signal is input to the power controller 216 in order to cause the heating wand to provide a predetermined amount of heating to the contents of a container such as a baby bottle.

Figure 10A:
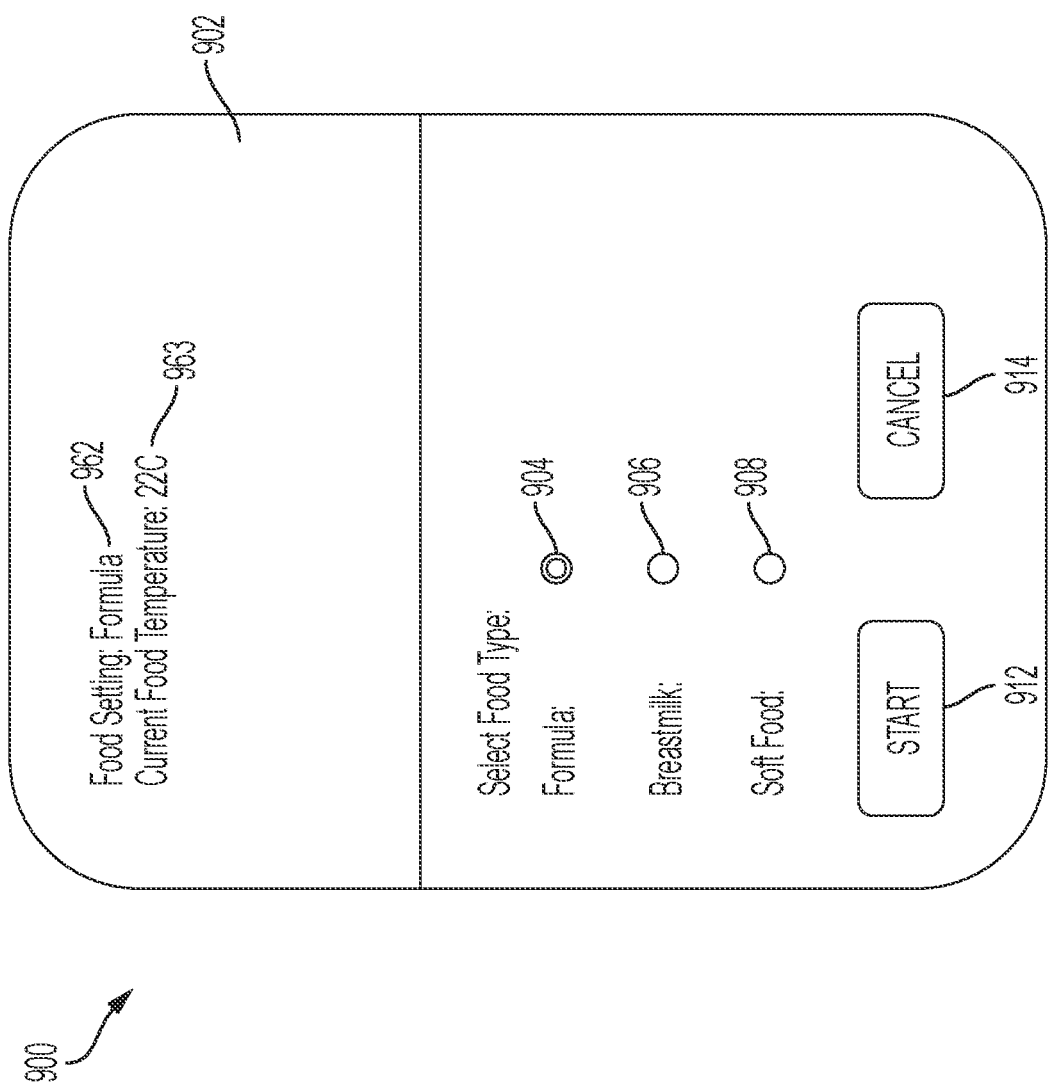
FIG. 10A shows an exemplary user interface in accordance with alternate embodiments of the present invention.

FIG. 10A shows an exemplary user interface 900 in accordance with alternate embodiments of the present invention. The user interface 900 can be implemented on a remote computer such as a smartphone, tablet computer, or other suitable computing device. The remote computer can execute an application (app) to send and/or receive information from the power unit 110 via the communication interface 208. Received information may be displayed in an information region 902. The information region 902 is an area of the display for showing values of various data fields. At 962, there is a field for a current food type setting. At 963, there is a field for current food temperature. The current food temperature may be obtained from a temperature sensor 136 located proximal to the first end of the heating wand, such as illustrated in FIG. 5B.

In embodiments, the processor is programmed to receive a food type setting from the remote computing device, and alter a pulse width modulated signal based on the food type setting.

At 904 there is an option for a food type of "formula." At 906 there is an option for a food type of "Breastmilk.". At 908 there is an option for a food type of "soft food." The soft food type can include foods such as purees, puddings, and/or oatmeal. As shown in FIG. 9, radio buttons are used for making a temperature setting selection. Other embodiments may utilize a different user interface, such as a slider control, dropdown list, or other user interface element. At 912, there is a start button. At 914, there is a cancel button. When the start button 912 is selected, it causes the remote computing device to send a command to the power unit to activate the heating wand. When the cancel button 914 is selected, it causes the remote computing device to send a command to the power unit to deactivate the heating wand. In embodiments, the processor is programmed to receive a temperature setting from the remote computing device, and alter a pulse width modulated signal based on the temperature setting. The pulse width modulated signal is input to the power controller 216 in order to cause the heating wand to provide a predetermined amount of heating to the contents of a container such as a baby bottle.

Figure 10B:
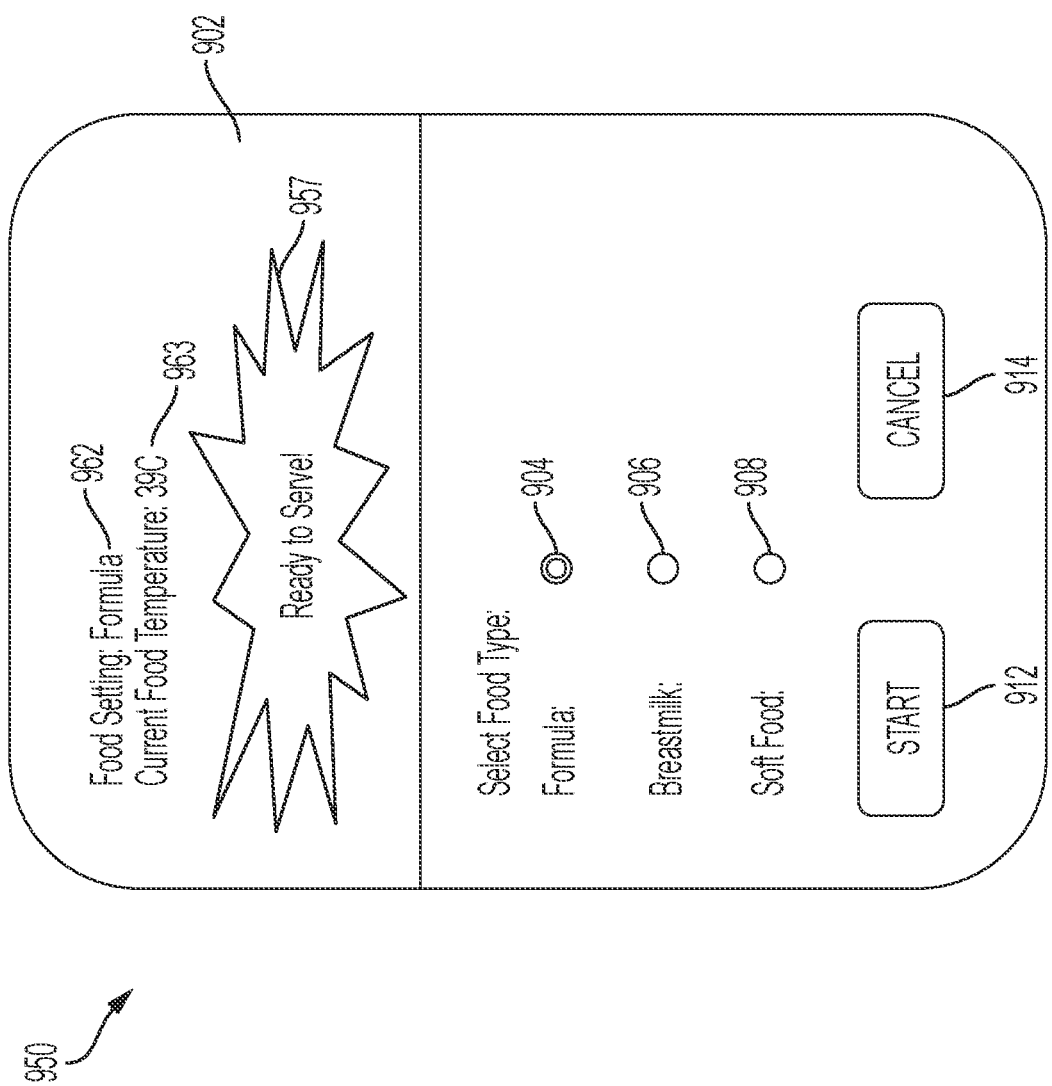
FIG. 10B shows an exemplary user interface in accordance with alternate embodiments of the present invention that provides a visual alert.

FIG. 10B shows an exemplary user interface 950 in accordance with alternate embodiments of the present invention that provides a visual alert. In user interface 950, when the current food temperature 963 reaches a predetermined target temperature, a visual alert 957 is rendered, indicating that the food/beverage is at the target temperature, and ready to serve.

Figure 11:
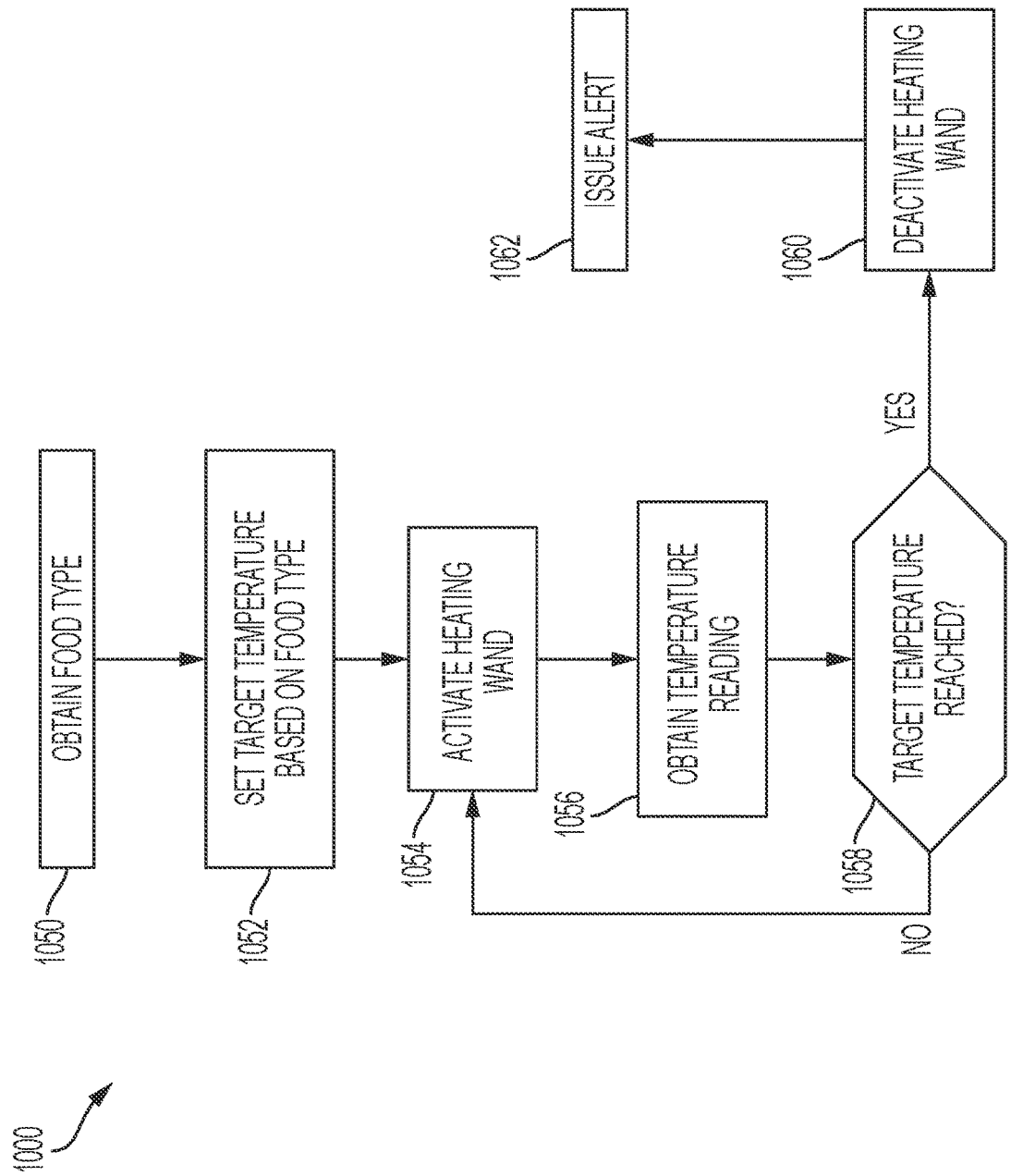
FIG. 11 is a flowchart indicating process steps for embodiments of the present invention.

FIG. 11 is a flowchart 1000 indicating process steps for embodiments of the present invention. At 1050, a food type is obtained. This can be from a user interface such as shown in FIG. 10. At 1052, a target temperature is set based on the food type. In embodiments, a data table relating temperature to food type is stored in the memory 204 of the power unit. As an example, in some embodiments, a food type of "formula" associates with a temperature of 38 degrees Celsius, a food type of "breastmilk" associates with a temperature of 39 degrees Celsius, and a food type of "soft food" associates with a temperature of 40 degrees Celsius. Other food types and/or associated temperatures may be used in disclosed embodiments.

At 1054, the heating wand is activated. Electricity is supplied to the internal heating element 134 to provide heat to the contents of a container. At 1056, a temperature reading is obtained from the temperature sensor 136. At 1058, a check is made to determine if the target temperature is reached. If no, then the process returns to 1054 where the heating wand remains activated. If yes, then the process continues to 1060, where the heating wand is deactivated. The process then continues with issuing an alert at 1062. In embodiments, the alert is issued through the sound source 214 of the power unit. In some embodiments, the alert may be issued by sending a message from the power unit to a remote computing device such as a smartphone and/or vehicle infotainment system, which in turn generates an audible and/or visual alert.

Thus, embodiments can include a processer programmed to obtain a temperature reading from the temperature sensor; and deactivate the heating wand in response to the temperature reading reaching a target temperature value. In some embodiments, the power unit further comprises a sound source, and the memory further contains instructions, that when executed by the processor, generate an audible alert via the sound source in response to the temperature reading reaching a target temperature value. Some embodiments may omit one or more of the steps shown in FIG. 11, include additional steps, perform some steps in a different order, and/or perform some steps concurrently.

Figure 12A:
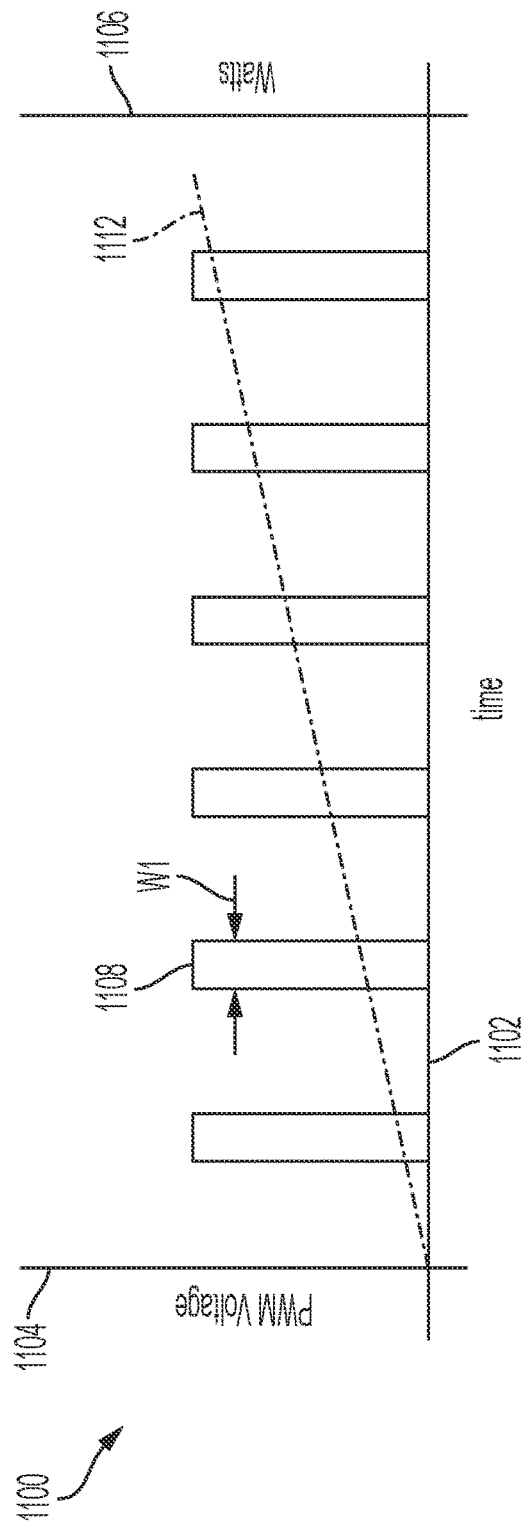
FIG. 12A is a graph showing operation of the heating wand at a first temperature setting.

FIG. 12A is a graph 1100 showing operation of the heating wand at a first temperature setting. Horizontal axis 1102 represents elapsed time. Vertical axis 1104 represents pulse width modulated (PWM) voltage. Vertical axis 1106 represents power in watts. The PWM signal is comprised of a plurality of pulses, shown generally as 1108. Each pulse 1108 has a width W1. The width represents the amount of time the PWM signal is asserted for a given pulse. The PWM signal is input to the power controller 216. The power controller 216 supplies power to the heating wand. The line 1112 indicates power supplied to the heating wand as a function of time.

Figure 12B:
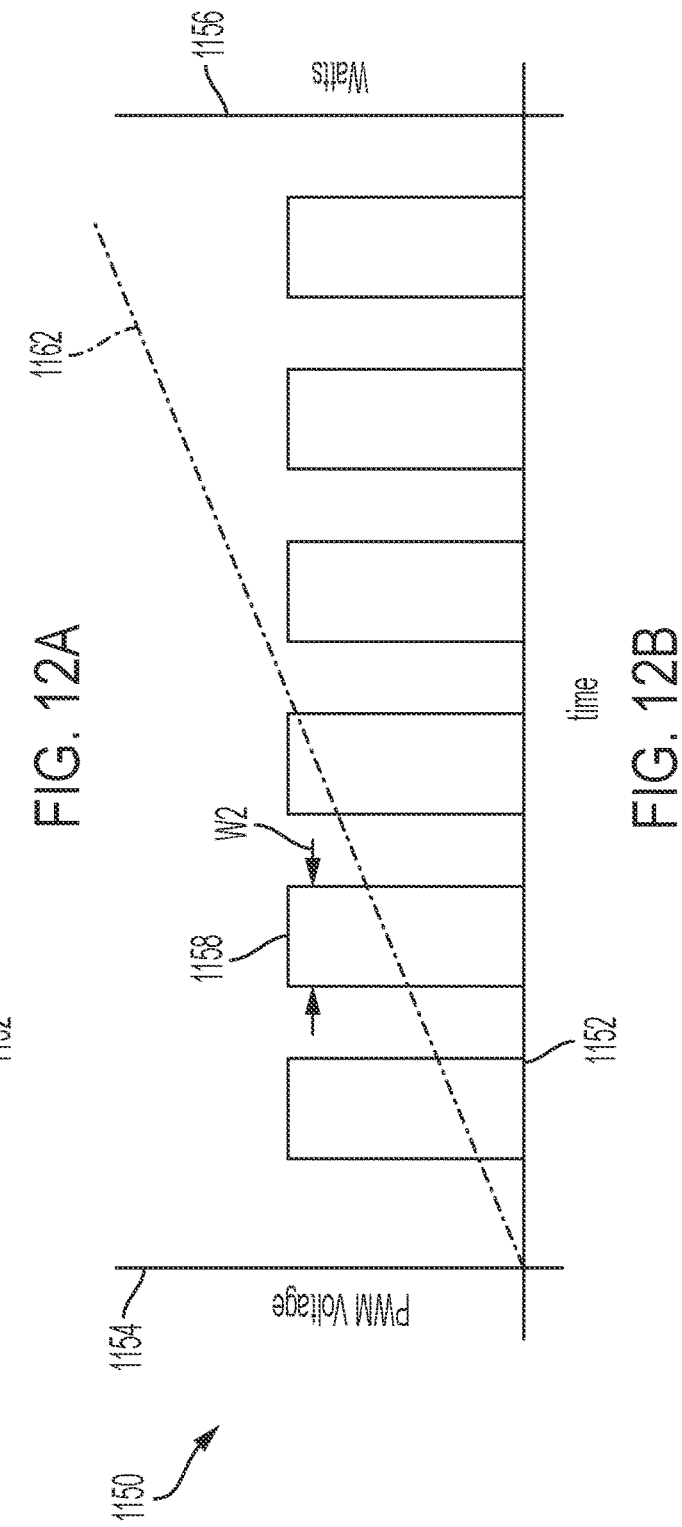
FIG. 12B is a graph showing operation of the heating wand at a second temperature setting.

FIG. 12B is a graph 1150 showing operation of the heating wand at a second temperature setting. Horizontal axis 1152 represents elapsed time. Vertical axis 1154 represents pulse width modulated (PWM) voltage. Vertical axis 1156 represents power in watts. The PWM signal is comprised of a plurality of pulses, shown generally as 1158. Each pulse 1108 has a width W2. The width represents the amount of time the PWM signal is asserted for a given pulse. The PWM signal is input to the power controller 216. The power controller 216 supplies power to the heating wand. The line 1162 indicates power supplied to the heating wand as a function of time. As shown in FIG. 12A and FIG. 12B, the second temperature setting is higher than the first temperature setting. Therefore, the slope of line 1162 is greater than the slope of line 1112 of FIG. 12A. In FIG. 12A and FIG. 12B, the PWM signal is referenced to the PWM Voltage axis (1104, 1154), and the power supply lines (1112, 1162) are referenced to the Watts axis (1106, 1156).

Figure 13A:
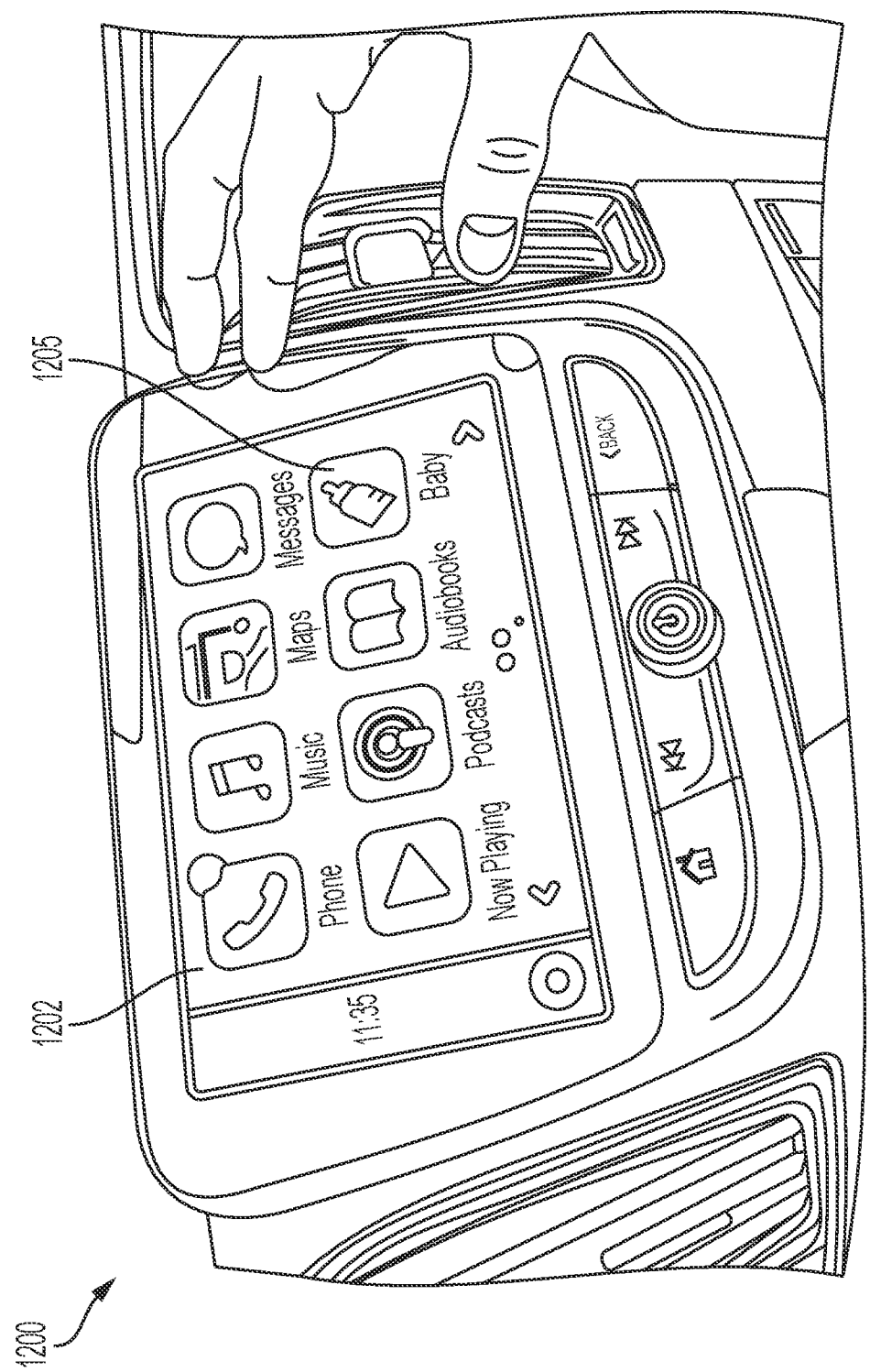
FIG. 13A shows an exemplary application menu for an infotainment system in accordance with embodiments of the present invention.

FIG. 13A shows an exemplary application menu 1202 for a vehicle infotainment system 1200 in accordance with embodiments of the present invention. In some embodiments, a remote computing device, such as a smartphone, may send and/or receive information from the power unit, and relay information to the vehicle infotainment system 1200. In embodiments, the remote computing device may utilize a wireless communication protocol such as Bluetooth® to communicate with the vehicle infotainment system 1200. The remote computing device may utilize an underlying protocol such as Apple CarPlay, Android Auto, or other suitable protocol, in order to enable control of the apparatus via the vehicle infotainment system 1200. This allows a user to operate the apparatus conveniently via the vehicle infotainment system 1200. As shown in FIG. 13A, the application menu 1202 includes an icon 1205. Upon detecting a press of the icon 1205, a food warming application is executed and rendered on the vehicle infotainment system 1200.

Figure 13B:
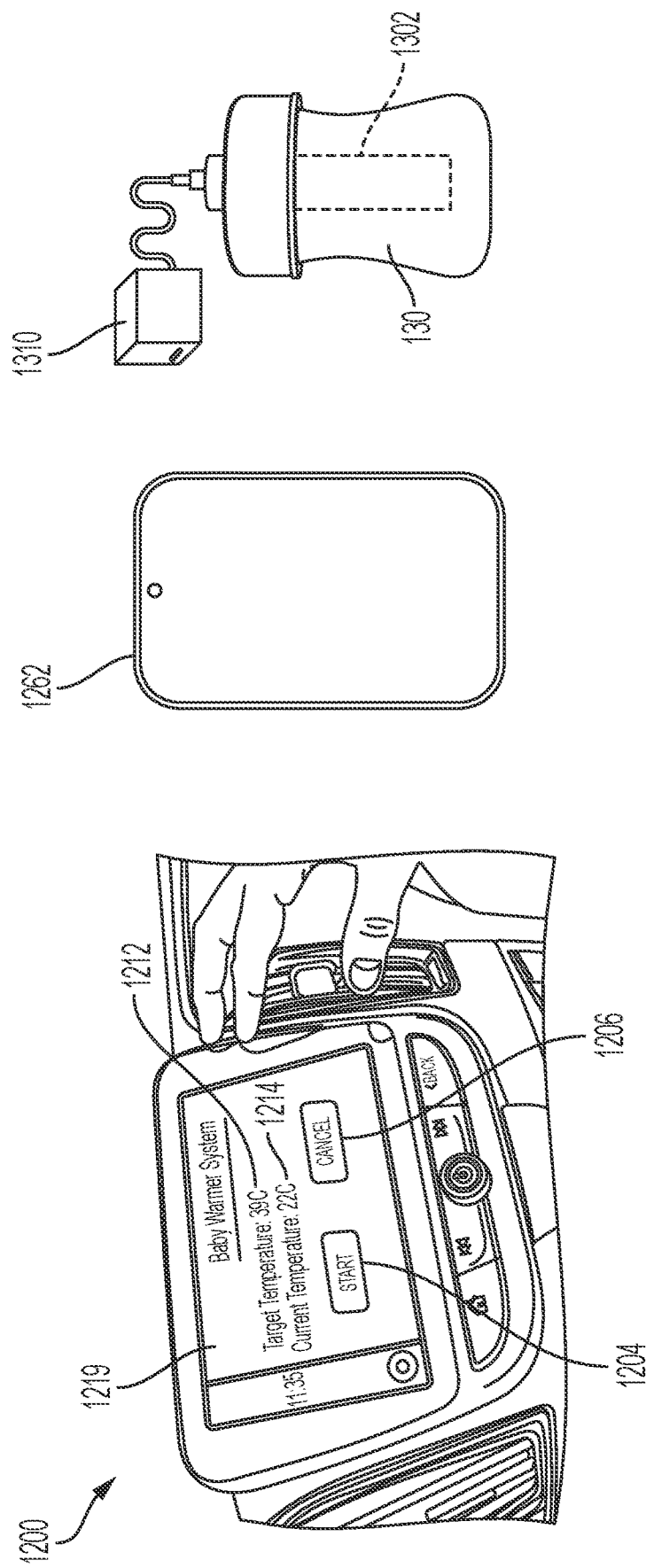
FIG. 13B shows an exemplary food warming application for an infotainment system in accordance with embodiments of the present invention.

FIG. 13B shows an exemplary food warming application 1219 for the vehicle infotainment system 1200. The food warming application 1219 shows a target temperature at 1212, and a current temperature of the food at 1214. A start button 1204 and a cancel button 1206 are also present in the food warming application 1219. Upon detecting a selection of start button 1204, the vehicle infotainment system 1200 may send a message to a remote computing device such as a smartphone 1262, which in turn sends a message to the power unit 1310, which then activates the heating wand 1302 that is placed in container 130. Similarly, upon detecting a selection of cancel button 1206, the vehicle infotainment system 1200 may send a message to a remote computing device such as a smartphone 1262, which in turn sends a message to the power unit 1310, which then deactivates the heating wand 1302. Power unit 1310 may be similar to power unit 200 shown in FIG. 2. In some embodiments, heating wand 1302 is similar to heating wand 102 of FIG. 5A. In some embodiments, heating wand 1302 is similar to heating wand 182 of FIG. 5B.

As can now be appreciated, disclosed embodiments provide for a convenient and safe solution for warming food and beverages for a baby. In particular, for busy, on-the-go parents and caregivers, disclosed embodiments stow easily in the cupholder of an automobile, and allow contents of baby bottles to be safely and efficiently heated.

Although described herein mainly as a solution for warming food and beverages for a baby, embodiments may be used for such for any type of food or beverage for an adult, animal, or other suitable purpose. In addition, embodiments may be used to heat liquids or gels for purpose other than food consumption, such as a chemical needed at a particular temperature for a desired reaction.

Unless otherwise described herein, components of the invention are made from plastic, glass, composite, metal, rubber, silicone, or any other suitable material, now known or hereafter developed.

Although embodiments of the invention have been described herein as systems and method, in some embodiments, the invention may include a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, and any suitable combination thereof. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. An apparatus, comprising
   a heating wand;
   a container cover; and
   a power unit, wherein the power unit comprises:
   a processor;
   a memory coupled to the processor;
   a power source;
   a power controller coupled to the processor and the power source; and wherein the memory contains instructions, that when executed by the processor, supply power from the power source to the heating wand based on a signal that is controlled by the processor wherein the power controller further comprises a communication interface,
   wherein the memory further contains instructions, that when executed by the processor, causes the processor to form a communication connection with a remote computing device; and
   wherein the memory further contains instructions, that when executed by the processor, cause the processor to receive a food type setting from the remote computing device.

2. The apparatus of claim 1, wherein the heating wand comprises a heating element extending from a first end of the heating wand, to an intermediate point, wherein the intermediate point is at a distance from a second end of the heating wand.

3. An apparatus, comprising
   a heating wand;
   a container cover; and
   a power unit, wherein the power unit comprises:
   a processor;
   a memory coupled to the processor;
   a power source;
   a power controller coupled to the processor and the power source; and wherein the memory contains instructions, that when executed by the processor, supply power from the power source to the heating wand based on a pulse width modulated signal that is controlled by the processor;
   wherein the heating wand comprises a heating element extending from a first end of the heating wand, to an intermediate point, wherein the intermediate point is at a distance from a second end of the heating wand;
   wherein the heating wand further comprises a temperature sensor located proximal to the first end of the heating wand;
   wherein the power controller further comprises a communication interface, and wherein the memory further contains instructions, that when executed by the processor, causes the processor to form a communication connection with a remote computing device; and wherein the memory further contains instructions, that when executed by the processor, cause the processor to receive a food type setting from the remote computing device, and alter the pulse width modulated signal based on the food type setting.

4. The apparatus of claim 3, wherein the memory further contains instructions, that when executed by the processor:
obtain a temperature reading from the temperature sensor; and
deactivate the heating wand in response to the temperature reading reaching a target temperature value.

5. The apparatus of claim 3, wherein the power controller further comprises a sound source, and wherein the memory further contains instructions, that when executed by the processor, generate an audible alert via the sound source in response to the temperature reading reaching a target temperature value.

6. The apparatus of claim 3, wherein the memory further contains instructions, that when executed by the processor, cause the processor to receive a temperature setting from the remote computing device, and alter the pulse width modulated signal based on the temperature setting.

7. The apparatus of claim 3, wherein the communication interface comprises a Bluetooth® interface.

8. The apparatus of claim 3, wherein the communication interface comprises a Wi-Fi interface.

9. A kit, comprising:
a heating wand;
a power unit, wherein the power unit comprises:
a processor;
a memory coupled to the processor;
a power source;
a power controller coupled to the processor and the power source; and wherein the memory contains instructions, that when executed by the processor, supply power from the power source to the heating wand based on a signal that is controlled by the processor
wherein the power controller further comprises a communication interface,
wherein the memory further contains instructions, that when executed by the processor, causes the processor to form a communication connection with a remote computing device; and
wherein the memory further contains instructions, that when executed by the processor, cause the processor to receive a food type setting from the remote computing device;
a container cover;
a cylindrical case, wherein the cylindrical case comprises a first portion, and a second portion,
wherein the first portion is attached to the second portion with a hinge;
wherein the heating wand, the power unit, and the container cover fit into the cylindrical case.

10. The kit of claim 9, wherein the cylindrical case has a diameter ranging from seven centimeters to ten centimeters.

11. The kit of claim 9, further comprising a second container cover.

* * * * *